United States Patent
Ghannam et al.

(10) Patent No.: US 10,239,469 B2
(45) Date of Patent: Mar. 26, 2019

(54) CAMERAS AND CAMERA HOUSINGS FOR VEHICLE TRAILERS

(71) Applicant: Ford Global Technologies, LLC, Dearborn, MI (US)

(72) Inventors: Mahmoud Yousef Ghannam, Canton, MI (US); Swadad Carremm, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 15/654,322

(22) Filed: Jul. 19, 2017

(65) Prior Publication Data

US 2019/0023194 A1    Jan. 24, 2019

(51) Int. Cl.
| | |
|---|---|
| *B60R 11/04* | (2006.01) |
| *H04N 5/225* | (2006.01) |
| *G03B 17/02* | (2006.01) |
| *B60R 1/00* | (2006.01) |

(52) U.S. Cl.
CPC .......... *B60R 11/04* (2013.01); *H04N 5/2252* (2013.01); *H04N 5/2257* (2013.01); *B60R 1/00* (2013.01); *B60R 2300/101* (2013.01); *B60R 2300/60* (2013.01); *B60R 2300/802* (2013.01); *B60R 2300/8006* (2013.01); *B60R 2300/806* (2013.01); *B60R 2300/8066* (2013.01)

(58) Field of Classification Search
None
See application file for complete search history.

(56) References Cited

U.S. PATENT DOCUMENTS

| | | | |
|---|---|---|---|
| 5,455,625 A | 10/1995 | Englander | |
| 6,118,757 A * | 9/2000 | Olsen ................. | G11B 23/0308 720/735 |
| 7,355,629 B2 | 4/2008 | Lang et al. | |
| 7,479,945 B2 * | 1/2009 | Lu ....................... | G06F 3/03543 345/163 |
| 9,172,903 B1 | 10/2015 | Englander et al. | |
| 9,266,474 B2 | 2/2016 | DeWard et al. | |
| 2014/0036132 A1 | 2/2004 | Pawlowski | |
| 2005/0040939 A1 | 2/2005 | Jobes et al. | |
| 2005/0264675 A1 * | 12/2005 | Enomoto ............. | H04N 5/2252 348/340 |
| 2006/0110146 A1 * | 5/2006 | Ariga ..................... | G03B 17/02 396/27 |

(Continued)

FOREIGN PATENT DOCUMENTS

| | | |
|---|---|---|
| CN | 104135600 A | 11/2014 |
| DE | 20219004 U1 | 4/2003 |

(Continued)

*Primary Examiner* — William B Perkey
(74) *Attorney, Agent, or Firm* — James P. Muraff; Neal, Gerber & Eisenberg LLP (57) ABSTRACT

Apparatus are disclosed for cameras and camera housings for vehicle trailers. An example camera housing for vehicle trailers includes a first body defining an aperture and a second body coupling to the first body to define a cavity. The example camera housing also includes a panel that slides along the first body toward an open position to expose the aperture as the cavity receives a camera and toward a closed position to cover the aperture as the camera is removed. The example camera housing also includes a spring biasing the panel toward the closed position.

20 Claims, 8 Drawing Sheets

(56) References Cited

U.S. PATENT DOCUMENTS

| | | |
|---|---|---|
| 2006/0176390 A1 | 8/2006 | Chou |
| 2009/0128687 A1 | 5/2009 | Woo |
| 2010/0209096 A1* | 8/2010 | Buschmann ............ B60R 11/04 396/448 |
| 2010/0325961 A1* | 12/2010 | Kusatsugu ........... G03B 11/043 49/150 |
| 2013/0155238 A1* | 6/2013 | Scudder ................. B60R 11/04 348/148 |
| 2016/0323484 A1 | 11/2016 | Moenig |
| 2017/0057423 A1 | 3/2017 | Wang |

FOREIGN PATENT DOCUMENTS

| | | |
|---|---|---|
| DE | 202006017665 U1 | 3/2007 |
| GB | 2469999 A | 11/2010 |
| WO | WO 200852178 A2 | 5/2008 |

* cited by examiner

CAMERAS AND CAMERA HOUSINGS FOR VEHICLE TRAILERS

CROSS-REFERENCE TO RELATED APPLICATIONS

This application is related to U.S. application Ser. No. 15/654,312 filed on Jul. 19, 2017, which is incorporated herein by reference in its entirety.

TECHNICAL FIELD

The present disclosure generally relates to cameras and, more specifically, to cameras and camera housings for vehicle trailers.

BACKGROUND

Generally, vehicles include storage areas (e.g., trunks, truck beds, etc.) to store objects. In some instances, a driver and/or a passenger of the vehicle may have an object that is unable to fit within the storage area of the vehicle. In such instances, a trailer may be utilized to store and transport the object. Typically, the trailer that stores the object is connected to a rear of the vehicle to enable the vehicle to tow the trailer and the object stored within the trailer as the vehicle travels along a road.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for cameras and camera housings for vehicle trailers. An example disclosed camera housing for vehicle trailers includes a first body defining an aperture and a second body coupling to the first body to define a cavity. The example disclosed camera housing also includes a panel that slides along the first body toward an open position to expose the aperture as the cavity receives a camera and toward a closed position to cover the aperture as the camera is removed. The example disclosed camera housing also includes a spring biasing the panel toward the closed position.

An example disclosed camera housing includes a first body defining a first of apertures, a second body that defines a second of the apertures and couples to the first body to define a cavity, and panels to slide along the first body and the second body. The panels slide toward an open position to expose the apertures as the cavity receives a camera and toward a closed position to cover the apertures as the camera is removed.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, vehicles include storage areas (e.g., trunks, truck beds, etc.) to store objects. In some instances, a driver and/or a passenger of the vehicle may have an object that is unable to fit within the storage area of the vehicle. In such instances, a trailer may be utilized to store and transport the object. Typically, the trailer that stores the object is connected to a rear of the vehicle to enable the vehicle to tow the trailer and the object stored within the trailer as the vehicle travels along a road.

The driver and/or the passenger of the vehicle may desire to monitor an area behind the trailer and/or an interior of the vehicle. For instance, the driver and/or the passenger may desire to monitor the object(s) stored within the trailer as the vehicle drives the trailer from one location to another. Further, the driver may desire to monitor the area behind the trailer to facilitate steering the vehicle that is towing the trailer. In some instances, cameras are utilized to monitor the interior and the exterior of the trailer. In some such instances, one or more cameras are installed within the trailer to monitor the interior of the trailer and another one or more cameras are installed along the exterior of the trailer to monitor the exterior of the trailer. Installing the multiple cameras to monitor the interior and the exterior of the trailer potentially may require additional hardware and/or wiring for the trailer. Further, installing the cameras (e.g., prior to driving the vehicle) and removing the cameras from the trailer (e.g., after driving the vehicle to prevent the cameras from being stolen) potentially may require additional maintenance and/or service time associated with towing the trailer via the vehicle.

Example apparatus disclosed herein include housings and cameras that reduce an amount of hardware, wiring, and/or service time for monitoring of an interior and/or an exterior of a trailer. Example housings disclosed herein enable the cameras to be adjustably positioned to capture image(s) and/or video of the interior and/or the exterior of the trailer. Further, some example cameras disclosed herein enable an orientation of a lens to be adjusted to capture image(s) and/or video of the interior and the exterior of the trailer without adjusting an orientation of a body of the camera.

Examples disclosed herein include a housing for a camera that is compatible with different cameras and trailers. The housing includes a first body and a second body that couple together to form a cavity. The camera is inserted into the cavity to couple to a trailer and is removed from the cavity to decouple from the trailer. The bodies are hingedly coupled together, for example, via a curved flange that facilitates rotatable and detachable opening and closing of the housing. The bodies include biased and/or unbiased latches and/or levers to open and close of the housing. The first body defines a first opening that enables the camera to obtain images within and/or outside of the trailer. The first body includes a first slide that covers the first opening when the first opening is not used. The first slide is biased to close when the camera is not within in the housing. In some examples, the second body defines a second opening that enables the camera to obtain images outside of and/or within the trailer. The second body includes a second slide that covers the second opening when the second opening is not used. The second slide is biased to close when the camera is not within the housing.

Examples disclosed herein include a camera that is to be positioned within a cutout of a wall of the a trailer. The camera has a cylindrical or spherical core that rotates about an axis (e.g., a horizontal axis) to adjust an orientation of a lens relative to a body of the camera. The core is rotated to adjust the orientation of the lens to enable the camera to capture image(s) and/or video of an interior and an exterior of a trailer without having to adjust a position and/or an orientation of a body of the camera relative to the trailer. For example, the core rotates the lens between a first orientation at which the camera is capable of capturing image(s) and/or video of the interior of the trailer and a second orientation at which the camera is capable of capturing image(s) and/or video of the exterior of the trailer.

Figure 1:
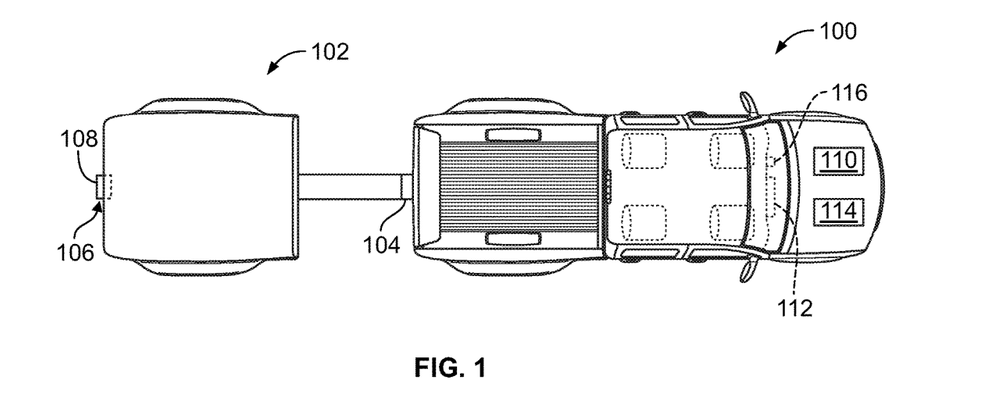
FIG. 1 illustrates an example vehicle and an example trailer in accordance with the teachings herein.

Turning to the figures, FIG. 1 illustrates an example vehicle 100 and an example trailer 102 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a hitch 104 at a rear of the vehicle 100. As illustrated in FIG. 1, the trailer 102 couples to the vehicle 100 via the hitch 104. The trailer 102 is coupled to the vehicle 100 to transport object(s) from one location to another location. For example, a user (e.g., a driver, a passenger) couples the trailer 102 to the vehicle 100 to transport object(s) when storage areas (e.g., trunks, flatbeds, back seats, etc.) within the vehicle 100 are unable to contain to those object(s).

The trailer 102 of the illustrated example includes a camera 106 (e.g., a camera 206 of FIGS. 2-5, a camera 1100 of FIGS. 11-14) and a housing 108 for the camera 106 in accordance with the teachings herein. As disclosed in further detail below, the housing 108 enables the camera 106 to obtain image(s) and/or video of an interior of the trailer 102 and/or of an exterior area around the trailer 102. For example, the camera 106 obtains image(s) and/or video of the interior of the trailer 102 to enable an occupant of the vehicle 100 (e.g., a passenger, a driver) to monitor the object(s) contained within the trailer 102. The camera 106 obtains image(s) and/or video of the exterior of the trailer 102 to enable an occupant of the vehicle 100 to monitor an area behind and/or adjacent to the trailer 102. Further, in some examples, image(s) and/or video of the area behind and/or adjacent to the trailer 102 that are captured by the camera 106 are utilized to facilitate performance of autonomous and/or semi-autonomous driving maneuvers of the vehicle 100.

As illustrated in FIG. 1, the vehicle 100 also includes a communication module 110, a display 112, a controller 114, and an input device 116. For example, the communication module 110 of the vehicle 100 communicatively couples to the camera 106, the display 112 presents images(s) and/or video captured by the camera 106, the controller 114 controls operation of the camera 106, and the input device 116 receives input(s) from a user to control operation of the camera 106.

In the illustrated example, the communication module 110 includes wired and/or wireless interface(s) for communication with the camera 106. The communication module 110 includes hardware (e.g., processors, memory, storage, antenna, etc.) and software to control the wired and/or wireless interfaces to establish communication with the camera 106 and/or other devices. In some examples in which the communication module 110 (e.g., a wireless communication module) wirelessly communicates with the camera 106, the communication module 110 is a short-range wireless module. In some such examples, the communication module 110 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other such examples, the communication module 110 may use WiFi, WiMax, NFC, UWB (Ultra-Wide Band), and/or any other communication protocol that enables the communication module 110 to wirelessly communicatively couple to the camera 106.

The display 112 of the vehicle 100 presents image(s) and/or video to occupant(s) of the vehicle 100, such as image(s) and/or video captured by the camera 106. For example, the display 112 presents image(s) and/or video captured by the camera 106 of the interior of the trailer 102 to enable the occupant(s) to monitor the interior of the trailer 102 while located within a cabin of the vehicle 100. the display 112 presents image(s) and/or video captured by the camera 106 of the interior of the trailer 102 to facilitate a driver in maneuvering the vehicle 100. The vehicle 100 includes a heads-up display, a center console display (e.g., a liquid crystal display (LCD), an organic light emitting diode (OLED) display, a flat panel display, a solid state display, etc.), and/or any other display within the vehicle 100 that is capable of presenting image(s) and/or video to the occupant(s) of the vehicle 100.

The controller 114 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The controller 114 controls operation of the camera 106. For example, the controller 114 positions the camera 106 in a first orientation to obtain image(s) and/or video of the exterior of the trailer 102 and/or positions the camera 106 in a second orientation to obtain image(s) and/or video of the interior of the trailer 102. For example, the controller 114 positions the camera 106 based upon input received via the input device 116 from an occupant of the vehicle 100. In some examples, the input device 116 includes the display 112 that is a touchscreen.

Figure 2:
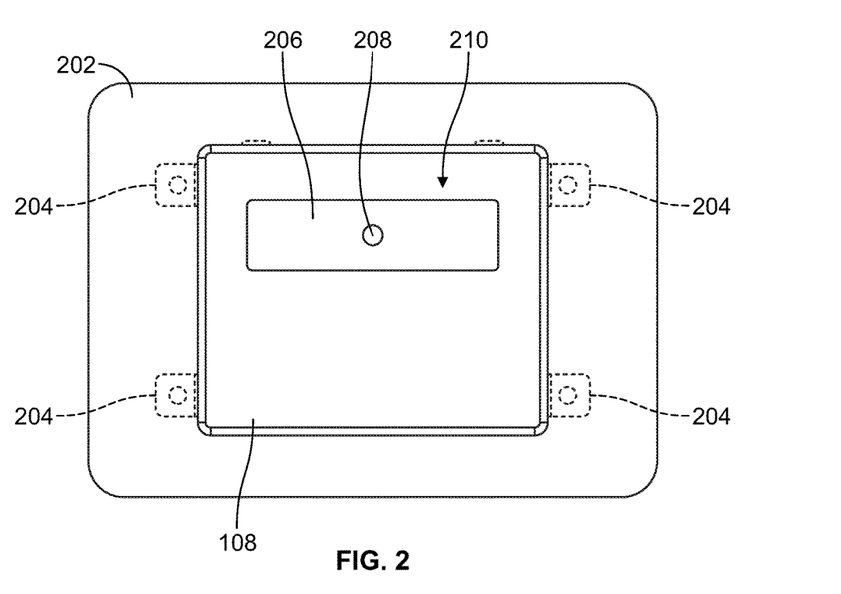
FIG. 2 illustrates an example camera housing coupled to a surface of the trailer of FIG. 1.

FIG. 2 illustrates the housing 108 coupled to a wall 202 (e.g., a rear wall) of the trailer 102. As illustrated in FIG. 2, the housing 108 includes flanges 204 that enable the housing 108 to couple to the wall 202 of the trailer 102. For example, the flanges 204 are coupled to the wall 202 via fasteners. In some examples, one or more of the flanges 204 are positioned within the interior of the trailer 102 and couple to an interior surface of the wall 202. Additionally or alternatively, one or more of the flanges 204 are positioned outside of the trailer 102 and couple to an exterior surface of the wall 202.

The housing 108 of the illustrated example contains a camera 206. The camera 106 is contained within the housing 108 to obtain image(s) and/or video of the interior and/or the exterior of the trailer 102. As illustrated in FIG. 2, the camera 206 includes a lens 208 that is positioned adjacent to a first aperture 210. The first aperture 210 of the housing 108 enables the camera 206 to obtain image(s) and/or video of objects outside of the housing 108 when the lens 208 of the camera 206 is positioned adjacent to the first aperture 210.

Figure 3:
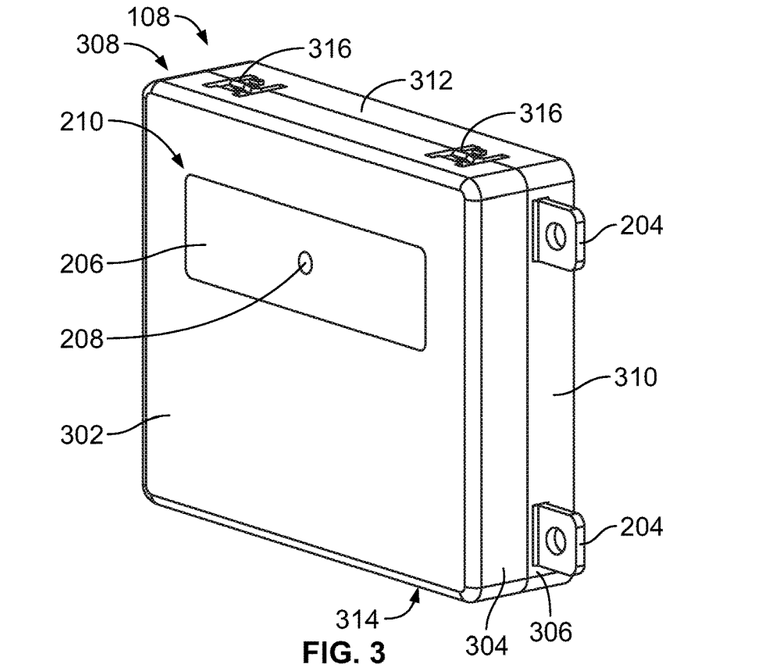
FIG. 3 illustrates a first face of the camera housing of FIG. 2 when a camera is positioned within the camera housing at a first orientation.
Figure 4:
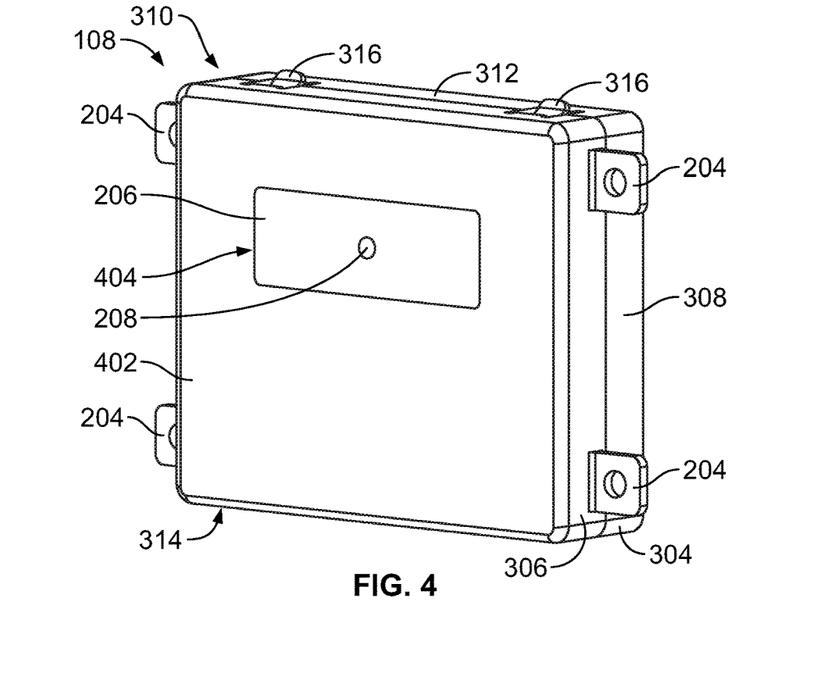
FIG. 4 illustrates a second face of the camera housing of FIG. 2 when a camera is positioned within the camera housing at a second orientation.

FIGS. 3-4 also illustrate the housing 108 when the camera 206 is positioned within the housing 108. More specifically, FIG. 3 depicts a first face 302 of the housing 108 when the camera 206 is positioned in a first orientation within the housing 108, and FIG. 4 depicts a second face 402 of the housing 108 when the camera 106 is positioned in a second orientation within the housing 108.

As illustrated in FIG. 3-4, the housing 108 is formed by a first body 304 and a second body 306. That is, the first body 304 and the second body 306 couple together to form the housing 108. In the illustrated example, the first face 302 is defined by the first body 304 and the second face 402 is defined by the second body 306. Further, when coupled together, the first body 304 and the second body 306 define a first side 308 (e.g., a left-hand side), a second side 310 (e.g., a right-hand side), a third side 312 (e.g., an upper side), and a fourth side 314 (e.g., a lower side) of the housing 108. For example, the second side is opposite the first side 308, the third side 312 extends between the first side 308 and the second side 310, and the fourth side 314 is opposite the third side 312 and also extends between the first side 308 and the second side 310. In the illustrated example, the housing 108 is oriented such that the third side 312 is oriented upward. However, in other instances, the housing 108 may be oriented such that the first side 308, the second side 310, or the fourth side 314 is oriented upward. Further, in other instances, the housing 108 may be oriented at an angle at which none of the sides (e.g., the first side 308, the second side 310, the third side 312, the fourth side 314) of the housing 108 are oriented upward in a direction perpendicular to the ground surface.

In the illustrated example, the first body 304 and the second body 306 couple together via latches 316 (e.g., biased latches, unbiased latches). As illustrated in FIGS. 3-4, the latches 316 are located along the third side 312 of the first body 304 and the second body 306 of the housing 108. Additionally or alternatively, one or more of the latches 316 are located along the first side 308, the second side 310, and/or the fourth side 314 of the first body 304 and the second body 306 of the housing 108. In other examples, the first body 304 and the second body 306 may couple together via other fastening mechanism(s) (e.g., levers) that enable the first body 304 and the second body to couple to and decouple from each other to close and open the housing 108, respectively.

Further, the flanges 204 of the illustrated example extend from the first side 308 and the second side 310 of the housing 108. In FIGS. 3-4, the flanges 204 extend from the first side 308 and the second side 310 of the second body 306. That is, some of the flanges 204 extend from the first side 308 of the second body 306, and some of the flanges 204 extend from the second side 310. In other examples, more and/or less of the flanges 204 extend from the first side 308 and/or the second side 310. Further, in some examples, one or more of the flanges 204 extend from the third side 312 and/or the fourth side 314 of the second body 306. Additionally or alternatively, one or more of the flanges 204 extend from the first side 308, the second side 310, the third side 312, and/or the fourth side 314 of the first body 304 of the housing 108.

As illustrated in FIG. 3, the first face 302 of the first body 304 defines the first aperture 210 of the housing 108. In FIG. 3, the camera 206 is positioned within a cavity (e.g., a cavity 504 of FIG. 5) of the housing 108 in a first orientation relative to the housing 108 such that the lens 208 of the camera 206 is adjacent to the first aperture 210. When the camera 206 is positioned in the first orientation within the housing 108, the camera 206 is capable of capturing image(s) and/or video in a direction of the first face 302 of the housing 108. For example, when the housing 108 is coupled to the wall 202 of the trailer 102 such that the first face 302 faces the exterior of the trailer 102, the housing 108 enables the camera 206 to capture image(s) and/or video through the first aperture 210 of the exterior of the trailer 102 when positioned in the first orientation. Further, when the housing 108 is coupled to the wall 202 of the trailer 102 such that the first face 302 faces the interior of the trailer 102, the housing 108 enables the camera 206 to capture image(s) and/or video through the first aperture 210 of the interior of the trailer 102.

As illustrated in FIG. 4, the second body 306 forms a second face 402 of the housing 108. For example, when the first body 304 and the second body 306 are coupled together, the second face 402 is opposite the first face 302. In the illustrated example, the second face 402 defines a second aperture 404 of the housing 108 that is opposite to the first aperture 210. In FIG. 4, the camera 206 is positioned within a cavity (e.g., the cavity 504 of FIG. 5) of the housing 108 in a second orientation relative to the housing 108. For example, the second orientation of the camera 206 in FIG. 4 is opposite to the first orientation of the camera 206 in FIG.

3. When the camera 206 is positioned in the second orientation relative to the housing 108, the lens 208 of the camera 206 is adjacent to second aperture 404 to enable the camera 206 to capture image(s) and/or video in a direction of the second face 402 of the housing 108. For example, when the housing 108 is coupled to the wall 202 of the trailer 102 such that the second face 402 faces the interior of the trailer 102 (e.g., when the first face 302 faces the exterior of the trailer 102), the housing 108 enables the camera 206 to capture image(s) and/or video through the second aperture 404 of the interior of the trailer 102 when positioned in the second orientation.

Figure 5:
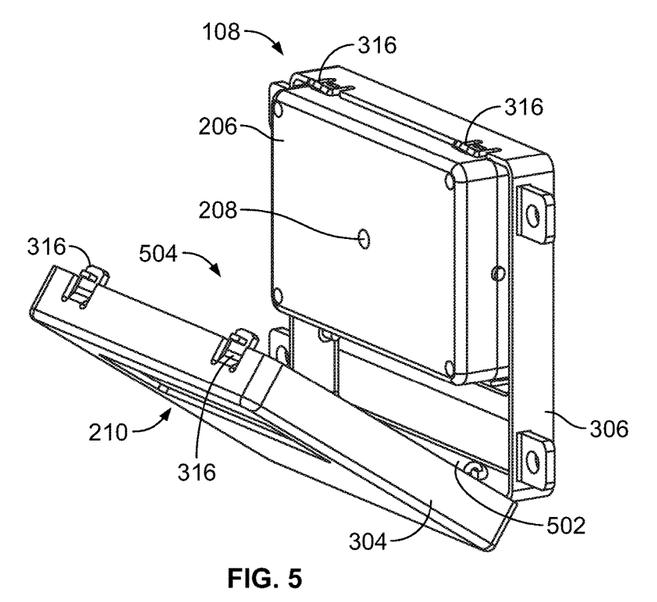
FIG. 5 illustrates the camera housing of FIG. 2 in an open position with an example camera positioned within the camera housing.

FIG. 5 illustrates the housing 108 in an open position in which the first body 304 and the second body 306 remain partially coupled to each other via a hinge 502. For example, the hinge 502 facilitates the latches 316 in coupling together the first body 304 and the second body 306 of the housing 108. In the illustrated example, the hinge 502 is located along the fourth side 314 of the housing 108. In other examples, the hinge 502 is located along the first side 308, the second side 310, or the third side 312.

As illustrated in FIG. 5, the first body 304 and the second body 306 define a cavity 504 of the housing 108 in which the camera 206 is received. When the first body 304 and the second body 306 are fully coupled together (e.g., via the latches 316), the cavity 504 of the housing 108 is enclosed by the first body 304 and the second body 306. That is, when the camera 206 is positioned in the cavity 504 and the housing 108 is closed together, the camera 206 is enclosed within the cavity 504 by the first body 304 and the second body 306.

In the illustrated example, the housing 108 enables the orientation of the camera 206 to be adjusted to affect the image(s) and/or video captured by the camera 206. In FIG. 5, the camera 206 is positioned in the first orientation at which the lens 208 of the camera 206 is to be adjacent to the first aperture 210 when the housing 108 is closed. For example, the camera 206 is positioned in the first orientation to obtain image(s) and/or video of the exterior of the trailer 102. In other examples, the camera 206 is positioned in the second orientation at which the lens 208 of the camera 206 is to be adjacent to the second aperture 404 when the housing 108 is closed. For example, the camera 206 is positioned in the second orientation to obtain image(s) and/or video of the interior of the trailer 102. The housing 108 is opened to enable the orientation of the camera 206 to be rotated to adjust the area of which the camera 206 is obtaining image(s) and/or video. That is, the first aperture 210 of the first body 304 and the second aperture 404 of the second body 306 enable the camera 206 to obtain image(s) and/or video of the exterior and/or the interior of the trailer 102. For example, the housing 108 remains coupled to the trailer 102 when the housing 108 is opened to enable the orientation of the camera 206 to be adjusted without requiring the housing 108 and/or the camera 206 to be unfastened and subsequently refastened to the trailer 102 (e.g., without adjusting the first body 304 and the second body relative to the wall 202 of the trailer 102).

Figure 6:
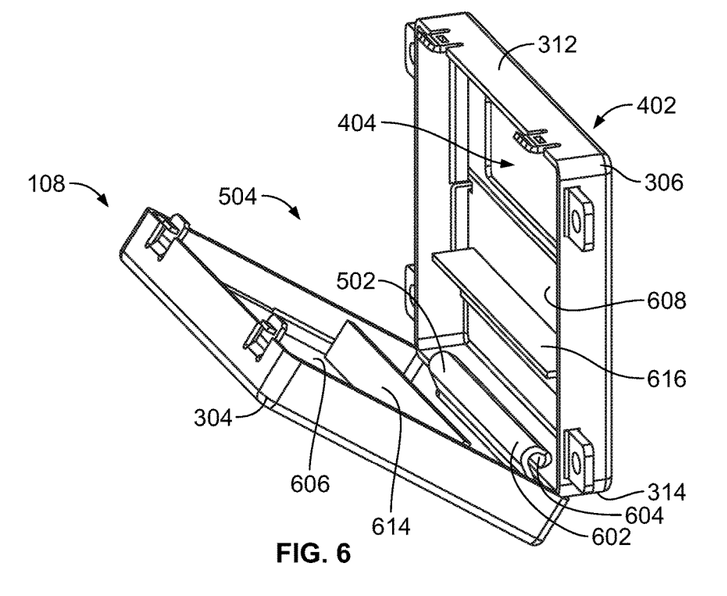
FIG. 6 illustrates the camera housing of FIG. 2 in the open position without a camera positioned within the camera housing.

FIG. 6 illustrates the housing 108 in the open position when the camera 206 is removed from the cavity 504 of the housing 108 (e.g., the driver removes the camera 206 upon exiting the vehicle 100). For example, the hinge 502 is a detachable hinge that includes a hook 602 extending from the first body 304 and a lip 604 extending from the second body 306. In the illustrated example, the hook 602 and the lip 604 of the hinge 502 are located along the fourth side 314 (e.g., the lower surface). Further, the hook 602 and the lip 604 and are configured such that the hook 602 may remain coupled to the lip 604 and rest in the open position when the housing 108 is opened. To decouple the hook 602 and the lip 604, the hook 602 is pushed in a direction toward the second face 402 and lifted in a direction toward the third side 312.

In the illustrated example, the housing 108 includes a first panel 606 that slides along the first body 304 and a second panel 608 that slides along the second body 306. The first panel 606 is positioned to slide along an interior surface 610 (e.g., a first interior surface) of the first body 304 within the cavity 504 of the housing 108, and the second panel 608 is positioned to slide along an interior surface 612 (e.g., a second interior surface) of the second body 306 within the cavity 504.

In FIG. 6, the first panel 606 and the second panel 608 are depicted in an open position at which the first panel 606 and the second panel 608 are capable of receiving the camera 206 (as illustrated in FIG. 5). Further, at the open position, the first panel 606 and the second panel 608 expose the first aperture 210 and the second aperture 404, respectively, to expose the first aperture 210 and/or the second aperture 404 for the lens 208 to enable the camera 206 to capture image(s) and/or video through the first aperture 210 and/or the second aperture 404 when the camera 206 is received within the cavity 504. As illustrated in FIG. 6, a shelf 614 (e.g., a first shelf) protrudes from the first panel 606, and a shelf 616 (e.g., a second shelf) protrudes from the second panel 608. The shelf 614 and/or the shelf 616 receive the camera 206 when the camera 206 is positioned in the cavity 504 of the housing 108 (FIG. 5). For example, the camera 206 rests on the shelf 614 and/or the shelf 616 as the first panel 606 and/or the second panel 608 are in the open position to receive the camera 206.

Figure 7:
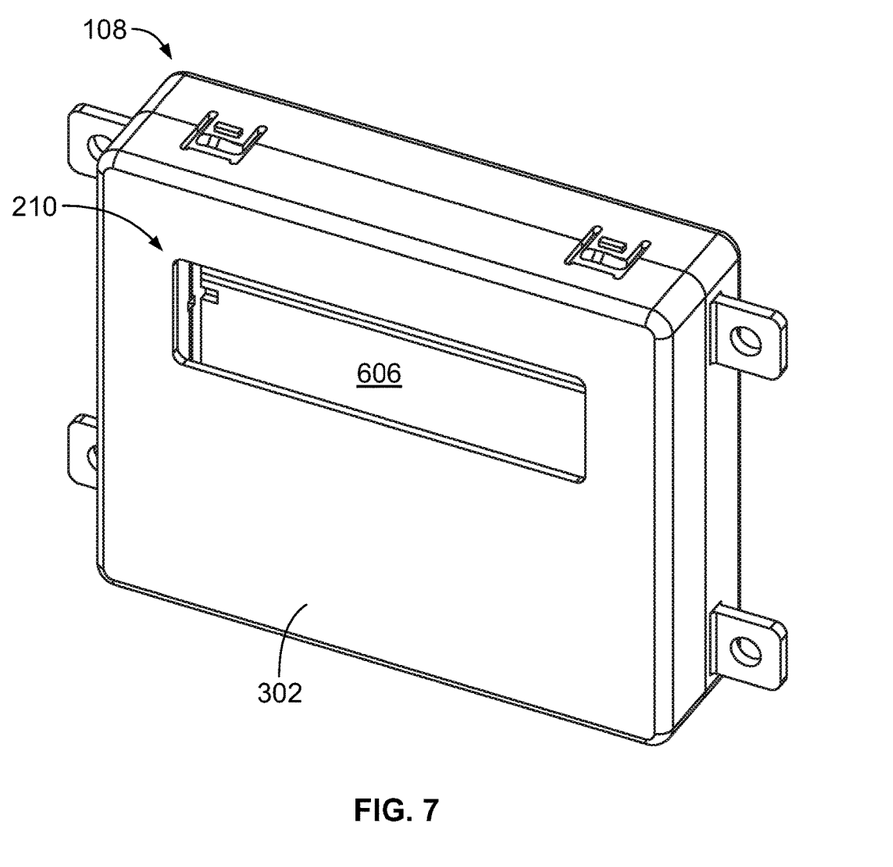
FIG. 7 illustrates the first face of the camera housing of FIG. 3 when a panel is in a closed position.
Figure 8:
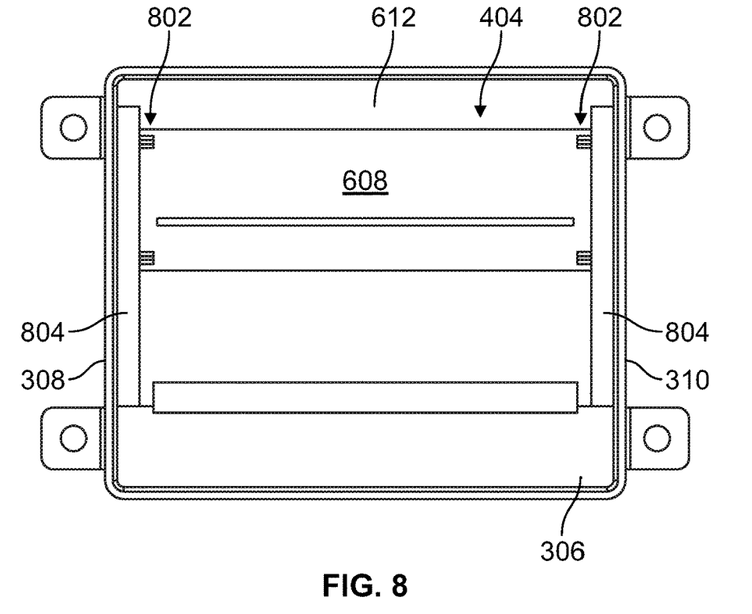
FIG. 8 illustrates an interior surface of the second face of the camera housing of FIG. 4 when a panel is in a closed position.

In other instances (as illustrated in FIGS. 7-8), the first panel 606 and the second panel 608 are in a closed position at which the first panel 606 and the second panel 608 are positioned adjacent to the first aperture 210 and the second aperture 404, respectively. For example, the first panel 606 and the second panel 608 are in the closed position when the camera 206 is removed from the cavity 504 of the housing 108 to prevent access to the cavity 504, to protect the interior of the housing 108, and/or to prevent people from viewing the interior of the trailer 102 through the first aperture 210 and the second aperture 404 of the housing 108.

The first panel 606 and the second panel 608 of the illustrated example slide between the open position and the closed position. For example, the first panel 606 and the second panel 608 slide toward the open position to receive the camera 206 and to expose the first aperture 210 and the second aperture 404 as the camera 206 is received by the cavity 504 of the housing 108. Further, the first panel 606 and the second panel 608 slide toward the closed position to cover the first aperture 210 and the second aperture 404, respectively, as the camera 206 is removed from the cavity 504 of the housing 108.

In the illustrated example, the first panel 606 and the second panel 608 are biased (e.g., via a biasing assembly 1002 of FIG. 10) toward the closed position to facilitate the first panel 606 and the second panel in sliding toward the closed position as the camera 206 is removed from the housing 108. For example, when inserted into the cavity 504, the camera 206 applies a force onto the shelf 614 of the first panel 606 and/or onto the shelf 616 of the second panel 608 to overcome the bias and cause the first panel 606 and the second panel 608 to slide to the open position. When the camera 206 is removed from the cavity 504, the camera no longer applies a force to the first panel 606 and/or the second panel 608 such that the first panel 606 and the second panel 608 return to the closed position via the bias.

FIG. 7 illustrates the first face 302 of the housing 108 when the first panel 606 is in the closed position. For example, the first panel 606 is in the closed position is in the closed position when the camera 206 is removed from the cavity 504 of the housing 108. In the closed position, the first panel 606 covers the first aperture 210 to prevent access to the cavity 504, to protect the interior of the housing 108, and/or to prevent people from viewing the interior of the trailer 102 through the first aperture 210 when the housing 108 is coupled to the wall 202 of the trailer 102.

FIG. 8 illustrates the interior surface 612 of the second body 306 of the housing 108 when the second panel 608 is in the closed position. For example, the second panel 608 covers the second aperture 404 in the closed position. The second panel 608 of the illustrated example is positioned to slide along the interior surface 612 of the second body 306 within the cavity 504. For example, the second panel 608 includes ends 802 that are at least partially positioned within tracks 804 defined by the second body 306. In the illustrated example, one of the tracks 804 (e.g., a first track) extends adjacent to the first side 308, and another of the tracks 804 (e.g., a second track) extends adjacent to the second side 310. Further, one of the ends 802 (e.g., a first end) extends into a corresponding one of the tracks 804, and another of the ends 802 (e.g., a second end) extends into a corresponding one of the tracks 804. The ends 802 of the second panel 608 slide within the tracks 804 of the second body 306 to enable the second panel 608 to slide between the closed position (FIG. 8) and the open position (FIG. 9).

Figure 9:
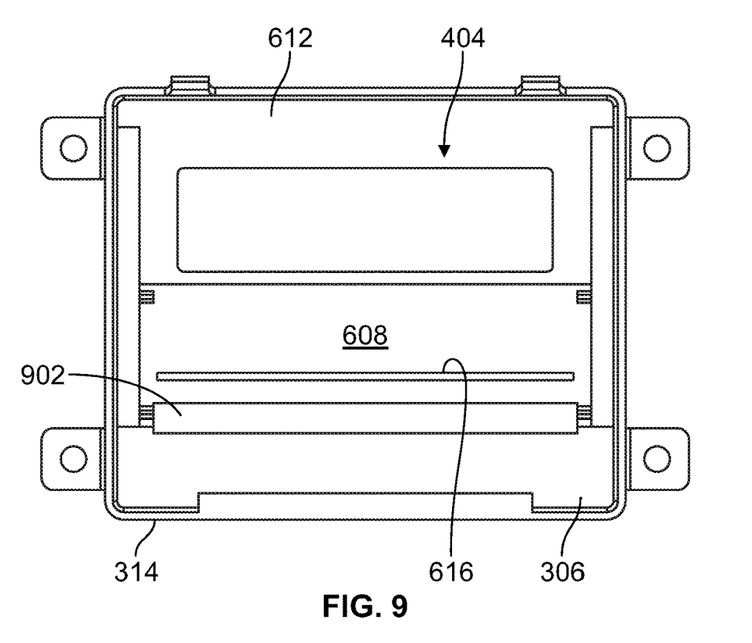
FIG. 9 illustrates the interior surface of the second face of the camera housing of FIG. 4 when the panel of FIG. 8 is in an open position.

FIG. 9 illustrates the interior surface 612 of the second body 306 when the second panel 608 is in the open position. As illustrated in FIG. 9, the second panel 608 exposes the second aperture 404 in the open position. In the illustrated example, a ledge 902 protrudes from the interior surface 612 of the second body 306 that extends adjacent to the fourth side 314. The ledge 902 engages the second panel 608 in the open position to prevent the second panel 608 from sliding beyond the open position. For example, the ledge 902 is positioned relative to the second aperture 404 such that the lens 208 of the camera 206 is adjacent to the second aperture 404 when the camera 106 rests on the shelf 616 of the second panel 608 to enable the camera 106 to capture image(s) and/or video through the second aperture 404.

FIGS. 8-9 depict the interior surface 612 of the second body 306. In some examples, the interior surface 610 of the first body 304 is substantially similar and/or identical to that of the interior surface 612 of the second body 306. For example, the interior surface 610 defines tracks along the first side 308 and the second side 310 to enable the first panel 606 to slide between the closed position and the open position and/or defines a ledge along the fourth side 314 to prevent the first panel 606 from sliding beyond the open position. The ledge of the first body 304 may be positioned relative to the first aperture 210 such that the lens 208 of the camera 206 is adjacent to the first aperture 210 when the camera 106 rests on the shelf 614 to enable the camera 106 to capture image(s) and/or video through the first aperture 210.

Figure 10:
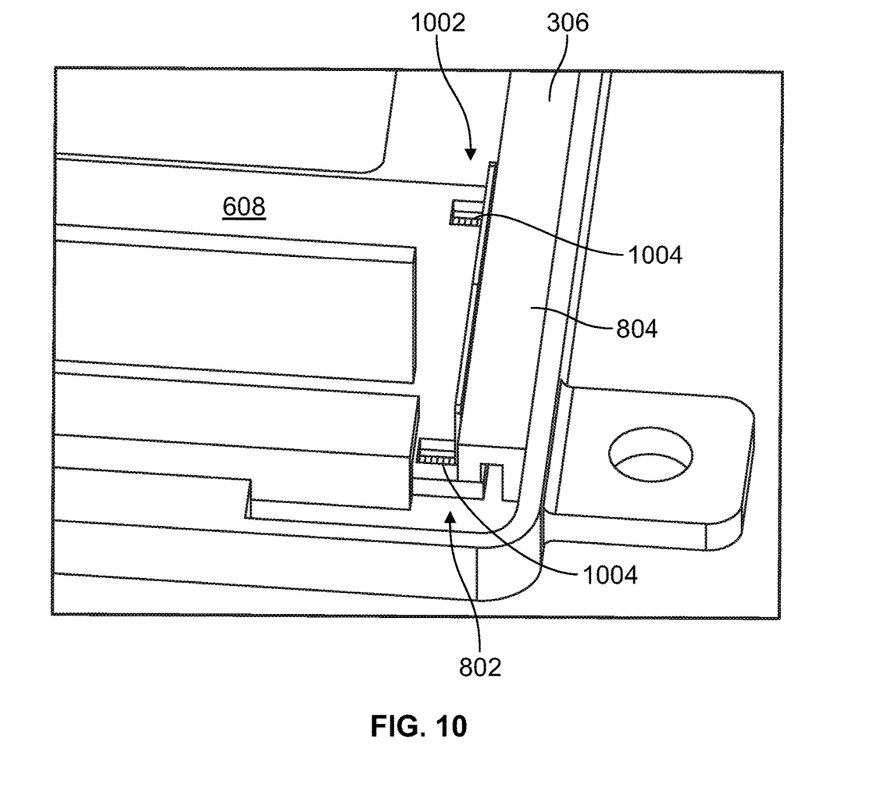
FIG. 10 illustrates a biasing assembly of the panel of FIG. 8.

FIG. 10 illustrates a portion of a biasing assembly 1002 of the second panel 608. The biasing assembly 1002 includes one or more springs 1004 that bias the second panel 608 toward the closed position. For example, the springs 1004 are compression springs that compress as the second panel 608 slides toward the open position and expand to a rest state as the second panel 608 slides toward the closed position. In the illustrated example, one or more (e.g., two) of the springs 1004 are positioned along one of the ends 802 of the second panel 608 adjacent to the one of the tracks 804 of the second body 306. Additionally or alternatively, one or more of the springs 1004 are positioned along the other of the ends 802 of the second panel 608 adjacent to the other of the tracks 804 of the second body 306.

Further, the first panel 606 includes a biasing assembly that is substantially similar and/or identical to the biasing assembly 1002 of the second panel 608. For example, the biasing assembly of the first panel 606 includes one or more springs that bias the first panel 606 toward the closed position. One or more of the springs are positioned along an end of the first panel 606 adjacent to a track of the first body 304 and/or one or more of the springs are positioned along another end of the first panel 606 adjacent to another track of the first body 304. That is, the housing includes one or more springs (e.g., one or more first springs) that bias the first panel 606 toward the closed position by compressing as the first panel 606 moves toward the open position and includes one or more of the springs 1004 (e.g., one or more second springs) that bias the second panel 608 toward the closed position by compressing as the second panel 608 moves toward the open position.

Figure 11:
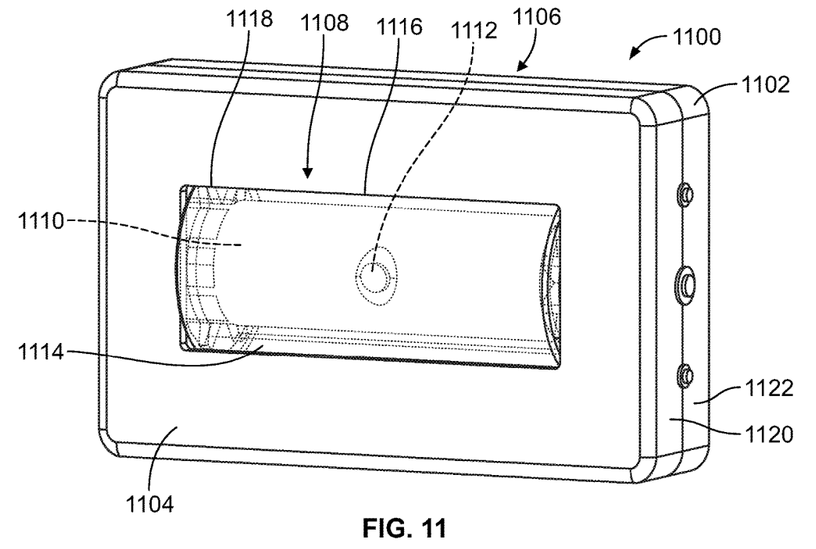
FIG. 11 illustrates another example camera in accordance with the teachings herein.

FIG. 11 illustrates another example camera 1100 in accordance with the teachings herein. As illustrated in FIG. 11, the camera 1100 includes a casing 1102 that defines a cavity (e.g., a cavity 1208 of FIG. 12). The casing 1102 includes a first face 1104 and a second face 1106 opposite the first face 1104. In the illustrated example, the first face 1104 of the casing 1102 defines a first window 1108 of the camera 1100.

As illustrated in FIG. 11, the camera 1100 includes a core 1110 (e.g., a cylindrical core, a spherical core) that is positioned within the cavity of the camera 1100. The core 1110 includes a lens 1112 of the camera 1100 for collecting light to capture image(s) and/or video. Further, the core 1110 is rotatably coupled to the casing 1102 within the cavity via an axle (e.g., an axle 1210 of FIG. 12). The axle rotates relative to the casing 1102 to cause the core 1110 to rotate relative to the casing 1102. Further, because the core 1110 includes the lens 1112 of the camera 1100, rotation of the axle causes an orientation of the lens 1112 to be adjusted relative to the casing 1102. In the illustrated example, the core 1110 is positioned at a first orientation at which the lens 1112 of the camera 1100 is adjacent to the first window 1108 to enable the camera 1100 to capture image(s) and/or video through the first window 1108.

In the illustrated example, the camera 1100 also includes a transparent cover 1114 that encases at least a portion of the core 1110 that includes the lens 1112. For example, the transparent cover 1114 encloses the lens 1112 to protect the lens 1112 from being damaged. The transparent cover 1114 is transparent to enable the lens 1112 to collect light through the transparent cover 1114 for capturing image(s) and/or video. Further, the transparent cover 1114 of the illustrated example is coupled to the core 1110 such that the transparent cover 1114 rotates with the core 1110. That is, rotation of the core 1110 via the axle causes rotation of the transparent cover 1114. As illustrated in FIG. 11, the transparent cover 1114 engages and/or contacts an edge 1116 (e.g., a first edge) of the first face 1104 that defines the first window 1108. For example, the edge 1116 cleans the transparent cover 1114 by scraping and/or otherwise removing material from the transparent cover 1114 as the transparent cover 1114 rotates via the axle relative to the edge 1116. In the illustrated example, the edge 1116 includes a seal 1118 (e.g., a silicone rubber seal) to facilitate cleaning of the transparent cover 1114.

Further, the seal 1118 and/or the edge 1116 engage and/or contact the transparent cover 1114 to seal the cavity of the casing 1102 from contaminant(s).

Further, in the illustrated example, the casing 1102 includes a first body 1120 and a second body 1122 that couple together to form the casing 1102. For example, the first body 1120 defines the first face 1104, and the second body 1122 defines the second face 1106. The first body 1120 and the second body 1122 decouple to access component(s) of the camera 1100 that are housed within the cavity of the casing 1102. In other examples, the casing 1102 is a single body that defines both the first face 1104 and the second face 1106.

Figure 12:
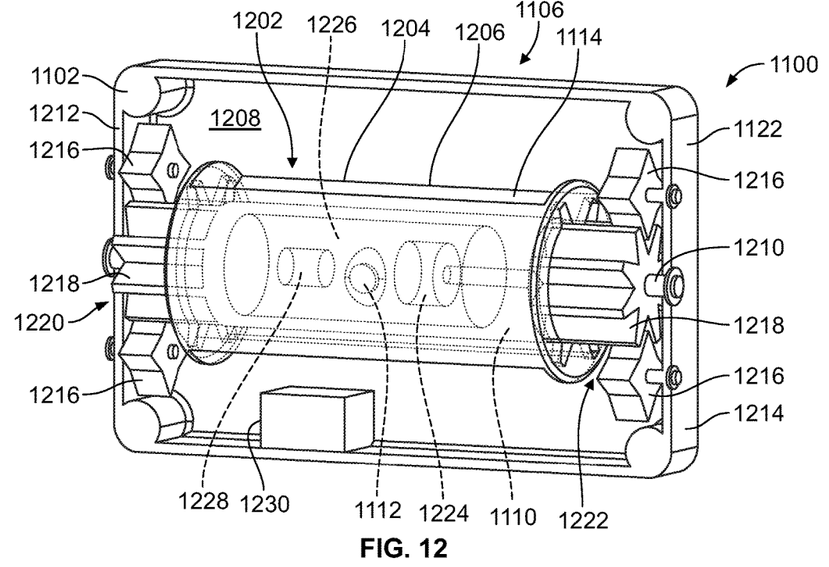
FIG. 12 is a partial cutaway view of the camera of FIG. 11.

FIG. 12 is a partial cutaway view of the casing 1102 of the camera 1100. For example, FIG. 12 depicts the camera 1100 when the first body 1120 is decoupled from the second body 1122 of the casing 1102. In the illustrated example, the second face 1106 defines a second window 1202. The second window 1202 is positioned opposite the first window 1108 when the casing 1102 is fully assembled (e.g., when the first body 1120 and the second body 1122 are coupled together).

The second window 1202 of the illustrated example is defined by an edge 1204 (e.g., a second edge) of the second face 1106. The edge 1204 engages and/or contacts the transparent cover 1114 that encloses at least a portion of the core 1110. For example, the edge 1204 cleans the transparent cover 1114 by scraping and/or otherwise removing material from the transparent cover 1114 as the transparent cover 1114 rotates relative to the edge 1204. In the illustrated example, the edge 1204 includes a seal 1206 (e.g., a silicone rubber seal) to facilitate cleaning of the transparent cover 1114. Further, the seal 1206 and/or the edge 1204 engage and/or contact the transparent cover 1114 to seal a cavity 1208 of the casing 1102 from contaminant(s).

As illustrated in FIG. 12, the casing 1102 defines the cavity 1208 in which the core 1110 is positioned. Further, the core 1110 is rotatably coupled to the casing 1102 via an axle 1210 that extends between a first side 1212 and a second side 1214 of the casing 1102. The first side 1212 and the second side 1214 of the casing 1102 extend between the first face 1104 and the second face 1106 of the casing 1102. In the illustrated example, the axle 1210 rotatably couples to the first side 1212 and the second side 1214 of the casing 1102 (e.g., by extending through apertures defined by the first side 1212 and the second side 1214). For example, the axle 1210 is rotatably coupled to the casing 1102 such that the axle 1210 is capable of making a complete rotation about its axis. In some examples, the core 1110 is coupled to the axle 1210 such that the core 1110 rotates with the axle 1210. In other examples, the core 1110 is integrally formed with the axle 1210 to enable the core 1110 to rotate with the axle 1210.

In the illustrated example, one or more gears 1216 are positioned within the cavity 1208 of the casing 1102 that facilitate rotation of the core 1110. For example, the gears 1216 are rotatably coupled to the casing 1102 via respective axles and drive and/or stabilize rotation of the core 1110. As illustrated in FIG. 12, the core 1110 defines teeth 1218 that mesh with the gears 1216 to enable the gears 1216 to rotatably couple to the core 1110. In the illustrated example, the core 1110 defines the teeth 1218 at a first end 1220 of the core 1110 and at a second end 1222 of the core 1110. One or more of the gears 1216 (e.g., one or more first gears) are adjacent to the first side 1212 and mesh with the teeth 1218 at the first end 1220 of the core 1110. Further, one or more of the gears 1216 (e.g., one or more second gears) are adjacent to the second side 1214 and mesh with the teeth 1218 at the second end 1222 of the core 1110.

The camera 1100 of the illustrated example includes a motor 1224 positioned within the cavity 1208 that drives rotation of the core 1110. For example, the motor 1224 that rotates the core 1110 is a stepper motor. In the illustrated example, the motor 1224 is positioned within a chamber 1226 of the core 1110 to enable the motor 1224 to operatively couple to the axle 1210. The motor 1224 is operatively coupled to the axle 1210 to cause the axle 1210 and, thus, the core 1110 to rotate. A battery 1228 is also positioned within the chamber 1226. The battery 1228 is electrically coupled to the motor 1224 to power the motor 1224. In other examples, the motor 1224 is positioned outside of the chamber 1226 of the core 1110. In such examples, the motor 1224 is operatively coupled to one or more of the gears 1216 to cause the one or more gears 1216 to rotate. Rotation of the one or more gears 1216 causes the axle 1210 and, thus, the core 1110 coupled to the axle 1210 to rotate. Additionally or alternatively, the motor 1224 is electrically coupled to a power source of the vehicle 100 via wires that extend to the camera 1100.

As illustrated in FIG. 12, the camera 1100 also includes a communication module 1230 that is communicatively couples to the communication module 110 of the vehicle 100. For example, the communication module 1230 receives instructions from the communication module 110 of the vehicle 100 to control positioning of the lens 1112 of the camera 1100 and/or sends image(s) and/or video that are captured by the camera 1100 to the communication module 110 of the vehicle 100.

In the illustrated example, the communication module 1230 includes wired and/or wireless interface(s) for communication with the vehicle 100. The communication module 1230 includes hardware (e.g., processors, memory, storage, antenna, etc.) and software to control the wired and/or wireless interfaces to establish communication with the vehicle 100 and/or other devices. In some examples in which the communication module 1230 wirelessly communicates with the vehicle 100, the communication module 1230 is a short-range wireless module. In some such examples, the communication module 1230 implements the Bluetooth®, Bluetooth® Low Energy (BLE) protocols, WiFi, WiMax, NFC, UWB (Ultra-Wide Band), and/or any other communication protocol that enables the communication module 1230 to wirelessly communicatively couple to the communication module 110 of the vehicle 100.

Figure 13:
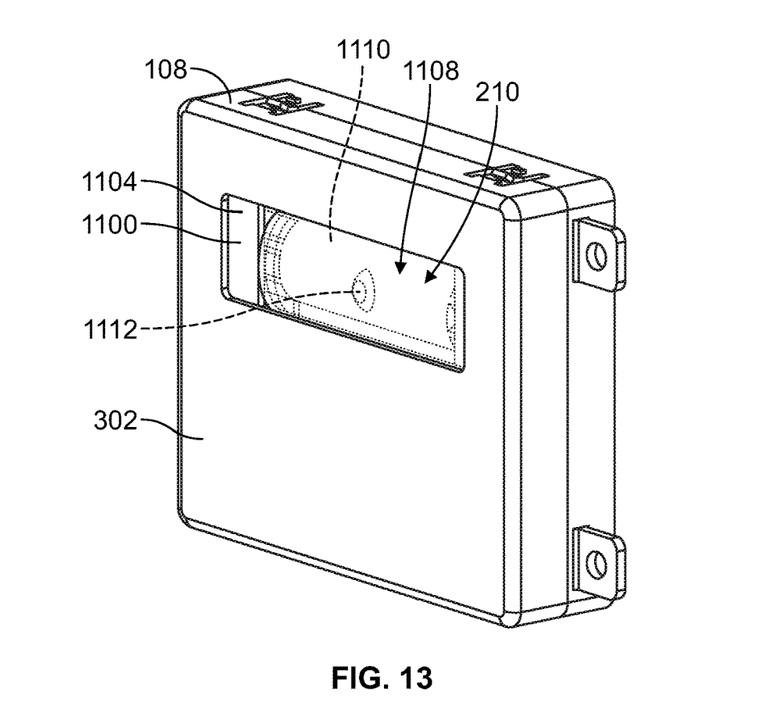
FIG. 13 illustrates a lens of the camera of FIG. 11 in a first orientation when the camera is positioned within the camera housing of FIG. 2.

FIG. 13 illustrates the lens 1112 of the camera 1100 in the first orientation within the housing 108. In the illustrated example, the core 1110 is rotated to position the lens 1112 at a first orientation adjacent to the first window 1108 of the casing 1102. Further, the camera 1100 is positioned within the cavity 504 of the housing 108 such that the first window 1108 defined by the first face 1104 of the camera 1100 aligns with the first aperture 210 defined by the first face 302 of the housing 108. Because the first window 1108 of the camera 1100 aligns with the first aperture 210 of the housing 108, the camera 1100 is capable of capturing image(s) and/or video through the first window 1108 and the first aperture 210 when the core 1110 of the camera 1100 is rotated to position the lens 1112 at the first orientation adjacent to the first window 1108.

When the housing 108 of the illustrated example is coupled to the trailer 102 such that the first face 302 of the housing 108 faces the exterior of the trailer 102, the camera 1100 is capable of capturing image(s) and/or video of the exterior of the trailer 102 when the lens 1112 is rotated to the first orientation. For example, when the lens 1112 is positioned at the first orientation, the camera 1100 is capable of capturing image(s) and/or video of a far zone of the exterior of the trailer 102. When the lens 1112 remains adjacent to the first window 1108 but is rotated slightly downward from the first orientation, the camera 1100 is capable of capturing image(s) and/or video of a near zone of the exterior. Further, when the lens 1112 remains adjacent to the first window 1108 but is rotated slightly upward from the first orientation, the camera 1100 is capable of capturing image(s) and/or video of another view of the exterior of the trailer 102.

Figure 14:
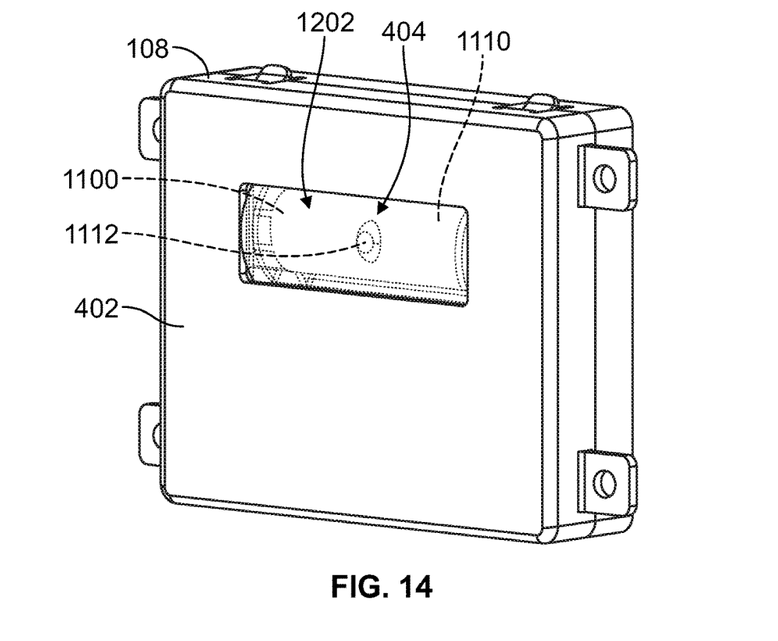
FIG. 14 illustrates the lens of FIG. 12 in a second orientation when the camera is positioned within the camera housing of FIG. 2.

FIG. 14 illustrates the lens 1112 the camera 1100 in a second orientation within the housing 108. In the illustrated example, the core 1110 is rotated to position the lens 1112 at a second orientation adjacent to the second window 1202 of the casing 1102. Further, the camera 1100 is positioned within the cavity 504 of the housing 108 such that the second window 1202 defined by the second face 1106 of the camera 1100 aligns with the second aperture 404 defined by the second face 402 of the housing 108. Because the second window 1202 of the camera 1100 aligns with the second aperture 404 of the housing 108, the camera 1100 is capable of capturing image(s) and/or video through the second window 1202 and the second aperture 404 when the core 1110 of the camera 1100 is rotated to position the lens 1112 at the second orientation adjacent to the second window 1202.

When the housing 108 of the illustrated example is coupled to the trailer 102 such that the second face 402 of the housing 108 faces the interior of the trailer 102, the camera 1100 is capable of capturing image(s) and/or video within the interior of the trailer 102 when the lens 1112 is rotated to the second orientation. For example, when the lens 1112 is positioned at the second orientation, the camera 1100 is capable of capturing image(s) and/or video of a far zone of the interior of the trailer 102. When the lens 1112 remains adjacent to the second window 1202 but is rotated slightly downward from the second orientation, the camera 1100 is capable of capturing image(s) and/or video of a near zone of the interior. When the lens 1112 remains adjacent to the second window 1202 but is rotated slightly upward from the second orientation, the camera 1100 is capable of capturing image(s) and/or video of another view of the interior of the trailer 102.

Further, because the position of the lens 1112 within the casing 1102 of the camera 1100 is adjustable via the core 1110, the camera 1100 is capable of capturing image(s) and/or video of both the exterior of the trailer 102 (e.g., through the first aperture 210 and the first window 1108) and the interior of the trailer 102 (e.g., through the second aperture 404 and the second window 1202) without adjusting the orientation of the casing 1102 of the camera 1100 within the housing 108.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A camera housing for vehicle trailers comprising:
   a first body defining an aperture;
   a second body coupling to the first body to define a cavity;
   a panel that slides along the first body toward an open position to expose the aperture as the cavity receives a camera and toward a closed position to cover the aperture as the camera is removed; and
   a spring biasing the panel toward the closed position.

2. The camera housing of claim 1, further including latches to couple the first body and the second body.

3. The camera housing of claim 2, wherein the cavity is enclosed by the first body and the second body when the first body and the second body are coupled together via the latches.

4. The camera housing of claim 1, further including flanges protruding from at least one of the first body and the second body to enable coupling to a surface of a trailer.

5. The camera housing of claim 1, wherein the aperture of the first body is to face an exterior of a trailer to enable the camera to obtain images of the exterior through the aperture or an interior of the trailer to enable the camera to obtain images of the interior through the aperture.

6. The camera housing of claim 1, wherein:
   the panel slides to the open position to expose the aperture for a lens of the camera to enable the camera to capture images while positioned within the cavity; and
   the panel slides to the closed position to cover the aperture to prevent access to the cavity.

7. The camera housing of claim 1, wherein the panel is positioned to slide along an interior surface of the first body within the cavity.

8. The camera housing of claim 7, further including a ledge protruding from the interior surface of the first body, the ledge is to engage the panel to prevent the panel from sliding beyond the open position.

9. The camera housing of claim 1, wherein the first body couples to the second body via a detachable hinge.

10. The camera housing of claim 1, further including a shelf protruding from the panel on which the camera is to rest within the cavity, the camera applies a force onto the shelf to cause the panel to slide toward the open position.

11. The camera housing of claim 1, wherein the second body defines a second aperture opposite the aperture.

12. The camera housing of claim 11, further including a second panel to slide along the second body, the second body to slide toward the open position as the cavity receives the camera to expose the second aperture, the second body to slide toward the closed position as the camera is removed from the cavity to cover the second aperture.

13. The camera housing of claim 12, wherein the aperture and the second aperture enable an orientation of the camera to be adjusted without changing an orientation of the first body and the second body.

14. A camera housing comprising:
    a first body defining a first of apertures;

a second body that defines a second of the apertures and couples to the first body to define a cavity; and panels to slide along the first body and the second body, the panels slide toward an open position to expose the apertures as the cavity receives a camera and toward a closed position to cover the apertures as the camera is removed.

15. The camera housing of claim 14, further including flanges protruding from at least one of the first body and the second body to enable coupling to a trailer.

16. The camera housing of claim 14, wherein:

the first of the apertures is oriented to face an exterior of a trailer to enable the camera to obtain images of the exterior through the first of the apertures;

the second of the apertures is oriented to face an interior of the trailer to enable the camera to obtain images of the interior through the second of the apertures; and the first of the apertures and the second of the apertures enable an orientation of the camera to be adjusted relative to the trailer without adjusting the first body and the second body relative to the trailer.

17. The camera housing of claim 14, wherein the panels include:

a first panel that slides along a first interior surface of the first body to expose and cover a first aperture of the apertures; and a second panel that slides along a second interior surface of the second body to expose and cover a second aperture of the apertures.

18. The camera housing of claim 17, further including:

a first spring that biases the first panel toward the closed position by compressing as the first panel moves toward the open position; and a second spring that biases the second panel toward the closed position by compressing as the second panel moves toward the open position.

19. The camera housing of claim 17, further including a first shelf protruding from the first panel and a second shelf protruding from the second panel, the camera to rest on at least one of the first shelf and the second shelf, and the camera to apply a force onto the first shelf and the second shelf to cause the first panel and the second panel to slide toward the open position.

20. The camera housing of claim 17, further including:

a first ledge protruding from the first interior surface that is to engage the first panel to prevent the first panel from sliding beyond the open position; and a second ledge protruding from the second interior surface that is to engage the second panel to prevent the second panel from sliding beyond the open position.

* * * * *